(12) United States Patent
Van Bommel et al.

(10) Patent No.: US 8,111,338 B2
(45) Date of Patent: Feb. 7, 2012

(54) BEAM SHAPING DEVICE

(75) Inventors: Ties Van Bommel, Eindhoven (NL);
Rifat Ata Mustafa Hikmet, Eindhoven (NL); Thomas Caspar Kraan, Eindhoven (NL); Nathalie Magali Danielle Dessaud, Eindhoven (NL); Jan Frank Stromer, Eindhovan (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 141 days.

(21) Appl. No.: 12/678,517

(22) PCT Filed: Sep. 12, 2008

(86) PCT No.: PCT/IB2008/053681
§ 371 (c)(1),
(2), (4) Date: Mar. 17, 2010

(87) PCT Pub. No.: WO2009/037617
PCT Pub. Date: Mar. 26, 2009

(65) Prior Publication Data
US 2010/0208185 A1    Aug. 19, 2010

(30) Foreign Application Priority Data

Sep. 20, 2007   (EP) .................................. 07116843

(51) Int. Cl.
*G02F 1/13* (2006.01)
(52) U.S. Cl. ............................................... 349/9; 349/1
(58) Field of Classification Search .............. 349/1, 9
See application file for complete search history.

(56) References Cited

U.S. PATENT DOCUMENTS

| 2004/0036829 A1 | 2/2004 | Sugimoto et al. |
| 2006/0250543 A1 | 11/2006 | Sugimoto et al. |
| 2006/0291243 A1 | 12/2006 | Niioka et al. |

FOREIGN PATENT DOCUMENTS

| EP | 0578827 A1 | 1/1994 |
| GB | 2411735 A | 9/2005 |
| JP | 07043656 A | 2/1995 |
| WO | 2005121641 A1 | 12/2005 |
| WO | 2006043196 A1 | 4/2006 |

OTHER PUBLICATIONS

McOwan et al: "A Switchable Liquid Crystal Binary Gabor Lens"; Optics Communicaitons, vol. 103, Issue 3-4, Nov. 15, 1993, pp. 189-193.

*Primary Examiner* — David Nelms
*Assistant Examiner* — Phu Vu

(57) ABSTRACT

A beam shaping device (1; 50; 60) comprising first (3) and second (4) substrates, a liquid crystal layer (2) sandwiched between the substrates, and a first electrode layer (5; 51) provided on a side of the first substrate (3) facing the liquid crystal layer (2). The beam shaping device is controllable between beam shaping states, each permitting passage of light through the beam shaping device, and further comprises an insulating layer (7) covering the first electrode layer (5; 51) and a second electrode layer (6; 53) provided on top of the insulating layer. The second electrode layer (6; 53) comprises a conductor pattern exposing a portion of the insulating layer (7). The beam shaping device is configured in such a way that application of a voltage (V) between the first (5; 51) and second (6; 53) electrode layers causes liquid crystal molecules comprised in a portion of the liquid crystal layer (2) corresponding to the exposed portion of the insulating layer to tilt in a plane perpendicular to the liquid crystal layer, resulting in a local refractive index gradient, thereby enabling shaping of a beam (8) of light passing through the beam shaping device.

13 Claims, 7 Drawing Sheets

BEAM SHAPING DEVICE

TECHNICAL FIELD

The present invention relates to a beam shaping device which is controllable between beam shaping states, each permitting passage of light through the beam shaping device.

BACKGROUND OF THE INVENTION

The ability to control the shape of a beam of light emitted by a light source is desirable in many applications ranging from general lighting to special lighting applications. Some examples are video flash, with beam shaping in combination with zooming, spot lights, flash lights, interior lights, head lamps and interior lamps.

Conventionally, this beam shaping is achieved by mechanical beam shaping devices, such as mechanically controllable zoom lens arrangements. Recently, more compact beam shaping devices, utilizing the controllable properties of liquid crystal materials have been developed. An example of such a beam shaping device is disclosed in EP 0 578 827, where a liquid crystal light regulating plate scatters a desired amount of light emitted from a light source. By changing a control power source voltage applied for controlling the light scattering rate, it is possible to continuously diverge the light beam passing through the beam shaping device to thereby change the brightness of the illuminating light.

Although being relatively compact and providing electrically controllable beam shaping, the beam shaping device disclosed in EP 0 578 827 suffers from loss of light due to backscattering. Moreover, the random scattering of this device is not well suited for controlled beam-shaping.

SUMMARY OF THE INVENTION

In view of the above-mentioned and other drawbacks of the prior art, a general object of the present invention is to provide an improved beam shaping device, in particular a beam shaping device capable of more efficient shaping of a beam of light passing therethrough.

According to the present invention, these and other objects are achieved through a beam shaping device comprising first and second substrates, a liquid crystal layer sandwiched between the substrates, and a first electrode layer provided on a side of the first substrate facing the liquid crystal layer. The beam shaping device is controllable between beam shaping states, each permitting passage of light through the beam shaping device. The beam shaping device further comprises an insulating layer covering the first electrode layer, and a second electrode layer provided on top of the insulating layer. The second electrode layer comprises a conductor pattern exposing a portion of the insulating layer. The beam shaping device is configured in such a way that application of a voltage between the first and second electrode layers causes liquid crystal molecules comprised in a portion of the liquid crystal layer corresponding to the exposed portion of the insulating layer to tilt in a plane perpendicular to the liquid crystal layer, resulting in a local refractive index gradient, thereby enabling shaping of a beam of light passing through the beam shaping device.

The liquid crystal layer may comprise any kind of liquid crystal molecules, and may be in any one of its phases. The nematic phase is, however, preferred due to its relatively low viscosity as compared with other liquid crystal phases such as the smectic phase. In this way shorter switching times can be obtained. The liquid crystal layer may further comprise a liquid crystal composite containing polymers.

The substrates, which may preferably be optically transparent, may be rigid or flexible and may, for example be made of glass or a suitable plastic material, such as poly-methyl methacrylate (PMMA).

By an "optically transparent" medium should be understood a medium which permits at least partial transmission of light (electromagnetic radiation including the visible spectrum, infrared and ultra violet light).

Each of the first and second electrode layers may be formed in any electrically conductive material, preferably, however, in an optically transparent conductive material, such as indium tin oxide (ITO) or indium zinc oxide (IZO).

As is well known from the theory of inhomogeneous optical materials, a ray of light encountering a refractive index gradient will bend towards a region with a higher refractive index. In a liquid crystal layer, the refractive index, and thereby the bending of a ray of light, can be controlled by reorienting the liquid crystal molecules comprised in the liquid crystal layer by application of an electric field. The present invention is based on the realization that the implementation of such refractive index gradient induced bending of light for beam shaping would practically eliminate backscattering, resulting in a more efficient beam shaping.

The present inventors have, moreover, realized that an electric field which is very favorable for controllable reorientation of liquid crystal molecules can be formed by providing, on one side of a liquid crystal layer, two electrode layers which are separated by an insulating layer. By forming the electrode layer positioned closest to the liquid crystal layer in such a way that a portion of the insulating layer is exposed, the application of a voltage between the two electrode layers results in the formation of a fringe field extending into the liquid crystal layer in a portion thereof corresponding to the exposed portion of the insulating layer.

Through this fringe field, a gradual reorientation of liquid crystal molecules over a relatively short lateral distance can be achieved, which results in a large refractive index gradient and accompanying bending of a beam of light passing through the portion of the liquid crystal layer.

Furthermore, this reorientation can be achieved using relatively low control voltages. As compared to other electrode configurations, such as, for example so-called in-plane switching, the electrode configuration of the beam-shaping device according to the present invention is tolerant to defects (connections between adjacent conductors) occurring during the patterning of the electrodes. Whereas in the case of in plane configuration this results in short-circuits.

Additionally, a large degree of flexibility in the beam shaping can be accomplished through proper design of the first and/or second electrode layers.

The insulating layer may, furthermore, comprise several layers of different dielectric materials, such as $SiO_2$, $SiN_x$. By selecting dielectric material and thereby dielectric constant and dielectric material thickness, the electric field configuration can be tuned for the specific application.

In order to achieve a desired large refractive index gradient, a liquid crystal material having a large birefringence, (that is, a large $\Delta n = n_e - n_o$, where $n_e$ is the refractive index for the extraordinary rays and $n_o$ is the refractive index for the ordinary rays) may advantageously be used. For example, a material having $\Delta n \geq 0.2$ may advantageously be used. Moreover, a relatively thick liquid crystal layer, such as a layer having a thickness of 10 μm or more, may advantageously be used in order for the rays of light to traverse a relatively long distance through the refractive index gradient material and, as a consequence, experience a large degree of bending. This combination of a large Δn and a large thickness represents a clear distinction in respect of the seemingly similar liquid crystal displays (LCDs) that utilize fringe field switching to achieve retardation of incident polarized light through rotation of liquid crystal molecules. Such LCDs need to be equipped with crossed polarizers and, moreover, cannot permit tilt of the liquid crystal (LC) molecules in a plane perpendicular to the LCD to take place. Therefore, and to achieve the short switching time required, the LC layer in a fringe field switching (FFS) LCD is very thin (4-6 μm). Moreover, the total retardation required for an LCD to function determines the available combinations of birefringence (Δn) and LC-layer thickness.

The second electrode layer may advantageously comprise a conductor pattern including a plurality of mutually spaced apart conductors.

In the spaces between the mutually spaced apart conductors, the insulating layer is exposed, and a fringe field can be formed in corresponding portions of the liquid crystal layer. Hereby, the active, beam shaping area of the beam shaping device can be increased.

Moreover, the mutually spaced apart conductors of the second electrode layer may be provided as essentially parallel conductor lines.

The conductor lines may have any shape; curved, straight, undulating, etc. Through this electrode configuration a large co-operating beam shaping area can be achieved, and thereby, beam shaping of a relatively wide beam accomplished.

The second electrode layer may advantageously comprise a first portion with essentially parallel conductor lines having a first principal direction of extension, and a second portion with essentially parallel conductor lines having a second principal direction of extension which is different from the first principal direction of extension. Hereby, more complex beam shapes can be achieved, since the incident rays of light bend in a plane perpendicular to the direction of extension of the conductor lines. Further portions having further different directions of extension may be utilized to achieve various specific beam shapes.

According to one embodiment, the liquid crystal layer may be homeotropically aligned when not subjected to an electric field.

When a liquid crystal layer is homeotropically aligned, the liquid crystal molecules are arranged perpendicularly to the liquid crystal layer, so that molecule ends are facing the substrates between which the liquid crystal layer is sandwiched. This prevents an unwanted twist of the LC molecules, and all the light in a beam of light can be controlled upon application of an electric field.

According to an alternative embodiment the liquid crystal molecules comprised in the liquid crystal (LC) layer may, in absence of an electric field acting on the molecules, be aligned in such a way that the long axis of each LC molecule is essentially parallel to the nearest substrate. Furthermore, in order to prevent the occurrence of an unwanted twist upon application of a voltage across the electrodes, the LC molecules may be oriented in the plane parallel to the nearest substrate in such a way that the long axis of each LC molecule is substantially perpendicular to an adjacent conductor in the second electrode layer. When an electric field is applied, the LC molecules are tilted and no twist of the molecules will take place. Through this state of initial orientation, all the light in a beam of a linearly polarized light can be controlled upon application of an electric field. This is not the case when a twist is introduced.

This kind of planar alignment may, for example, be achieved through so called rubbing techniques or by photo alignment. In case of multiple regions having various electrode patterns or curved electrodes, these regions should typically be treated individually during manufacturing to bring about the desired planar alignment.

Further, the first electrode layer may advantageously comprise a conductor pattern including a plurality of mutually spaced apart conductors.

This gives an extra freedom in controlling the directions of the electric field lines and thus the refractive index gradient induced within the liquid crystal layer.

Moreover, a third electrode layer may be provided between the first and second electrode layers, wherein the third electrode layer includes a conductor pattern having a plurality of mutually spaced apart conductors. This third electrode layer should be separated from each of the first and second electrode layers by a corresponding insulating layer. Through the addition of the third electrode layer, the number of electric field patterns achievable in the liquid crystal layer is increased, whereby a larger number of beam-shapes can be achieved. By, for example, applying a voltage between the second and third electrode layers instead of between the second and first electrode layers, the beam shape characteristics of the beam shaping device will change.

According to a further embodiment of the beam shaping device according to the present invention, the second substrate may, on a side thereof facing the liquid crystal layer, be provided with first and second electrode layers and an insulating layer sandwiched between the electrode layers, the second electrode layer being arranged closer to the liquid crystal layer than the first electrode layer.

Hereby, a more complex electric field pattern can be achieved. In particular, the liquid crystal molecules can be controlled to reorient in a first plane of reorientation on the first substrate side, and to reorient in a second plane of reorientation on the second substrate side. For example, the first and second planes may be perpendicular to each other, whereby the two polarization components of incident unpolarized light can be controlled simultaneously.

This can be achieved by providing the second electrode layer of the first substrate to include a plurality of mutually spaced apart and essentially parallel conductor lines, and the second electrode layer of the second substrate to include a plurality of mutually space apart and essentially parallel conductor lines being essentially perpendicular to the conductor lines of the second electrode layer provided on the first substrate.

Furthermore, first and second beam shaping devices according to the present invention may advantageously be arranged in a stacked structure to form a beam shaping arrangement. The beam shaping characteristics of the constituent beam shaping devices can be utilized to provide improved beam shaping.

Each of the first and second beam shaping devices may comprise a plurality of essentially parallel conductor lines in its respective second electrode layer.

The first and second beam shaping devices may be arranged in relation to each other in such a way that the essentially parallel conductor lines of the first beam shaping device are substantially perpendicular to the essentially parallel conductor lines of the second beam shaping device.

Further, the beam shaping arrangement may comprise an optical member, which is arranged between the first and second beam shaping devices and which is adapted to alter a polarization state of a light beam passing through the beam shaping arrangement.

This optical member may, for example, be a rotator for altering the polarization state of the light after passage of the first beam shaping device, and before passage of the second beam shaping device. Hereby, polarization independent beam shaping can be achieved although the LC layer acts on the light beam in a polarization dependent manner. The rotator may be provided in the form of a so called retardation plate or a liquid crystal material, such as a liquid crystal polymer. For rotating linearly polarized light by 90°, a so called half wave plate or LC material in a twisted nematic configuration may be used.

Moreover, the beam shaping device according to the present invention may advantageously be comprised in a light output device further comprising a light source, such as a light emitting diode or a semiconductor laser, arranged so that a light beam emitted by the light source passes through said beam shaping device. Such a light output device may advantageously include the beam shaping arrangement discussed above.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF PREFERRED EMBODIMENTS OF THE INVENTION

In the following description, the present invention is described with reference to a beam shaping device having a homeotropically aligned liquid crystal layer—the liquid crystal (LC) molecules comprised in the LC layer are oriented perpendicular to the substrates when no voltage is applied to the electrodes. It should be noted that this by no means limits the scope of the present invention, which is equally applicable to beam shaping devices in which the liquid crystal molecules are aligned in any other way, such as a planar orientation in which the LC-molecules are oriented in a plane parallel with the substrates. In this orientation, the LC-molecules may be aligned in parallel with or perpendicular to the electrodes, or have a hybrid orientation where the LC molecules have a first orientation adjacent to the first substrate and a second orientation, orthogonal to the first orientation, adjacent to the second substrate.

Furthermore, in order not to obscure the present invention by details not directly related thereto, further layers well known to a person skilled in the art, such as alignment layers for aligning the LC-molecules etc have neither been depicted in the accompanying drawings, nor described in detail herein.

Figure 1A:
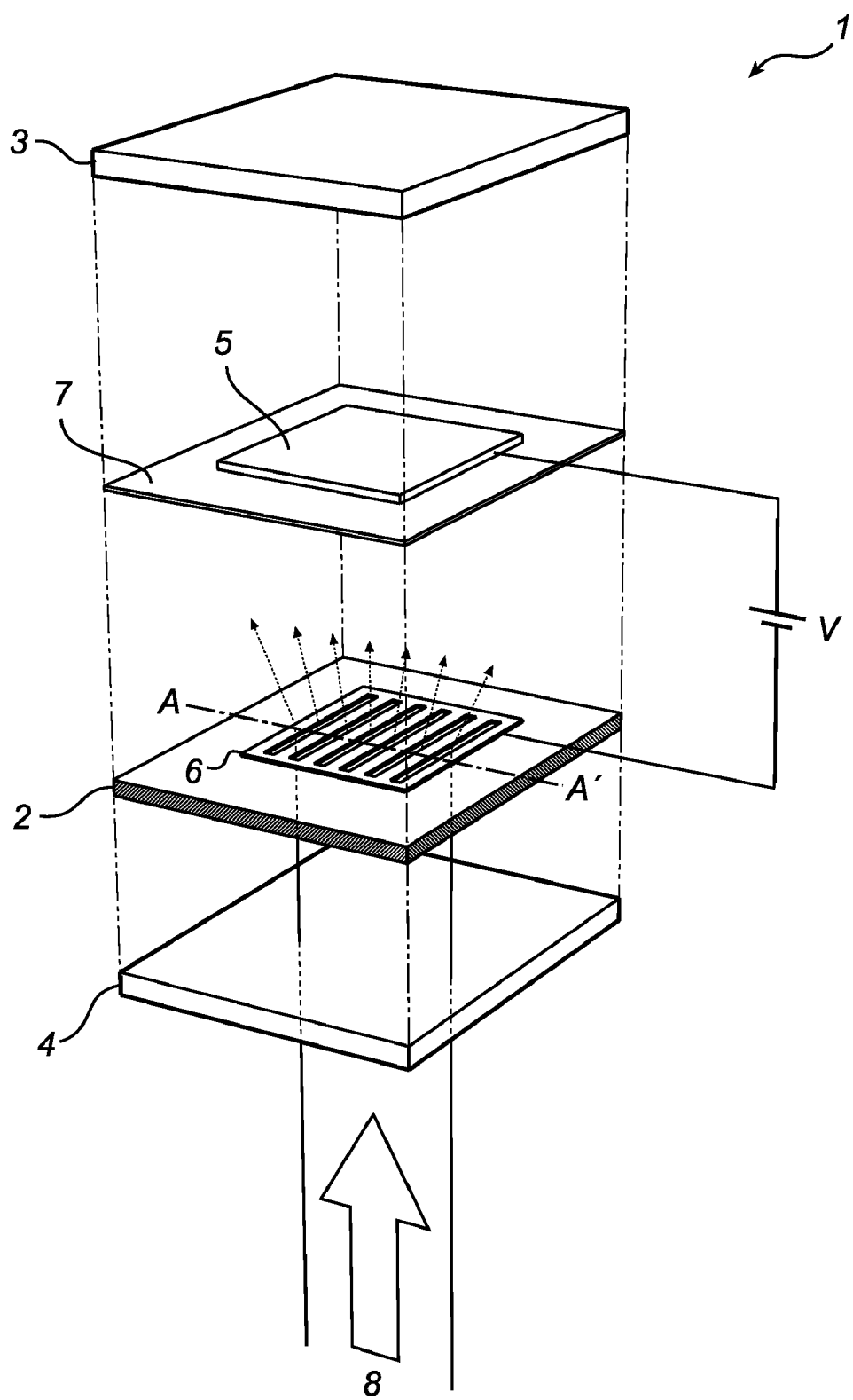
FIG. 1a is an exploded perspective view of an exemplary beam shaping device according to an embodiment of the present invention.
Figure 1B:
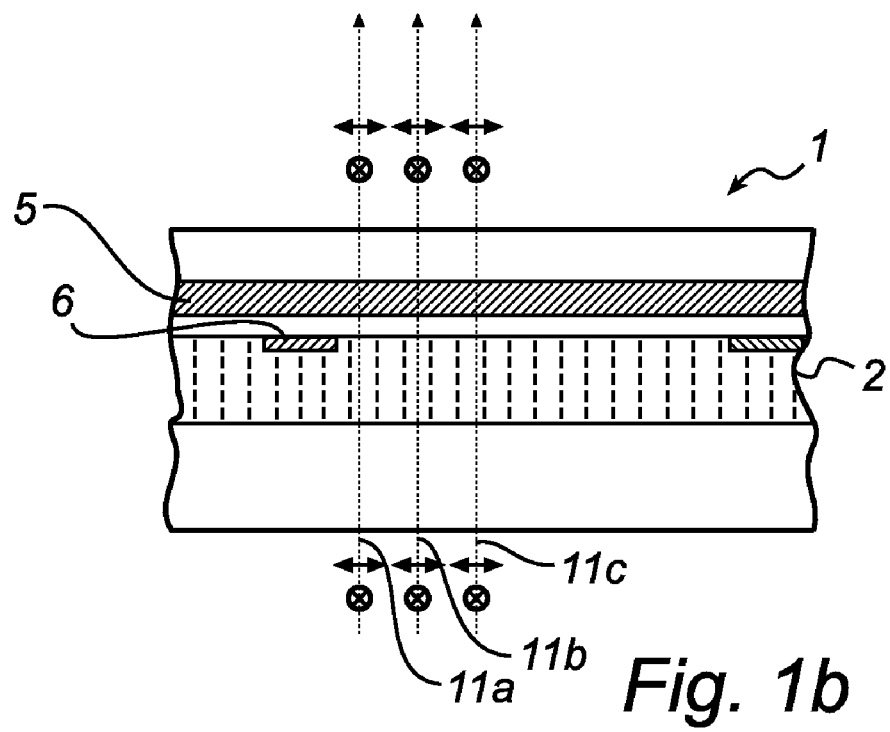
FIG. 1b is a cross-section view of the beam shaping device in FIG. 1a along the line A-A' when no voltage is applied across the electrodes.
Figure 1C:
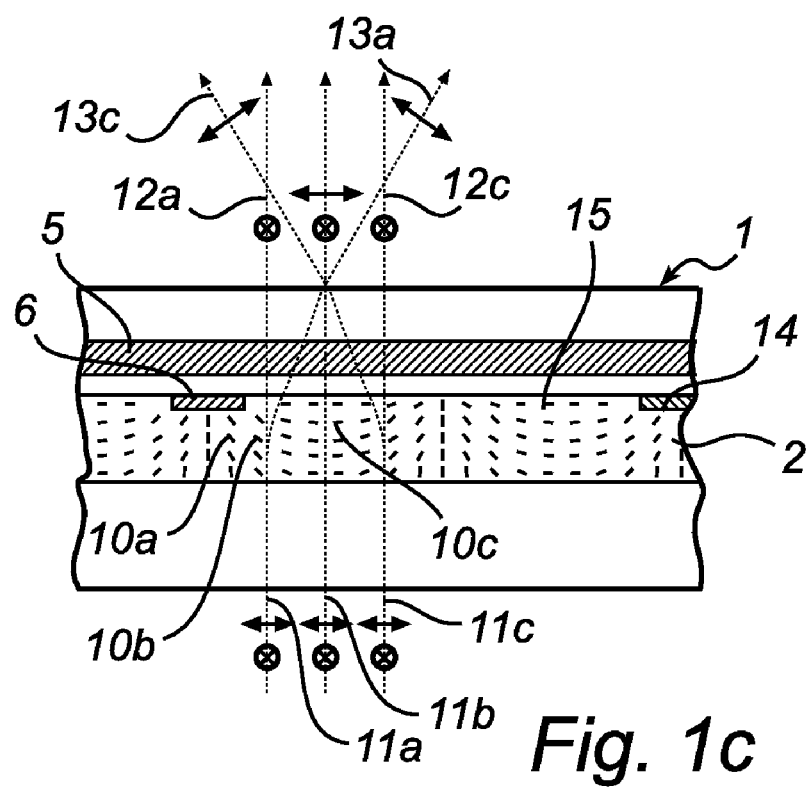
FIG. 1c is a cross-section view of the beam shaping device in FIG. 1a along the line A-A' when a voltage V is applied across the electrodes.

It should be noted that the drawings are not to scale. To, however, give an idea of suitable dimensions, it can be said that the width of a conductor line in the electrodes would typically range from 1 μm to 20 μm. Furthermore, the conductor lines are typically spaced apart by 10 μm to 100 μm, and the thickness of the LC layer is generally between 5 μm and 50 μm, and preferably between 10 μm and 50 μm. FIGS. 1a-c schematically illustrate an exemplary beam shaping device according to an embodiment of the present invention.

In FIG. 1a, a beam shaping device 1 is shown, comprising a homeotropically aligned liquid crystal (LC) layer 2 sandwiched between first 3 and second 4 transparent substrates. On the first substrate 3, a first transparent electrode layer 5, and a second transparent electrode layer 6, separated by an insulating layer 7 are provided. The second electrode layer 6 is provided with essentially parallel conductor lines. By applying a voltage V over these electrode layers 5, 6, a collimated light beam 8 incident on the beam shaping device can be diverged as is schematically illustrated in FIG. 1a.

FIG. 1b, which is a cross-section view along the line A-A' in FIG. 1a, schematically shows the situation where no voltage is applied across the electrode layers 5, 6. Since no voltage is applied, no electric field is formed, and, consequently, the LC-molecules have the orientation imposed on them by the alignment layers (not shown). In the case illustrated in FIG. 1b, the LC-molecules are homeotropically aligned, and the shape of the incident light beam 8, here represented by three parallel rays 11a-c of light is unchanged by the passage through the beam shaping device 1.

With reference to FIG. 1c which schematically shows the situation where the voltage V is applied across the electrode layers 5, 6, the beam shaping mechanism utilized by the beam shaping device in FIG. 1a will now be described in more detail.

As is schematically shown in FIG. 1c, the liquid crystal (LC) molecules 10a-c comprised in the LC layer 2 are aligned to the electric field lines created above the conductor lines 14 of the second electrode layer 6 as well as above the electrode opening 15 where the insulating layer 7 is exposed. Due to this reorientation, regions of the LC layer 2 having different refractive indices are formed. In the exemplary case illustrated in FIG. 1c, the refractive index experienced by a light beam 8 hitting the beam shaping device 1 in a direction which is (locally) perpendicular thereto varies between the ordinary refractive index $n_o$ resulting from LC molecules 10a oriented perpendicular to the LC layer 2 and the extraordinary refractive index $n_e$ resulting from LC molecules 10c oriented in parallel with the LC layer 2. Light hitting the beam shaping device 1 between a portion thereof with "perpendicular" LC-molecules 10a and a portion thereof with "parallel" LC-molecules 10c will experience an intermediate refractive index.

In FIG. 1c, the three rays 12a, b, c representing the linear polarization component of unpolarized light having a direction of polarization which is perpendicular to the long axis of the LC molecules (ordinary rays) pass through the beam shaping device 1 practically without experiencing a refractive index gradient. Thus neither of these rays 12a-c has its direction altered significantly during passage through the LC-layer 2.

The other polarization component, rays 13a, b, c, representing light polarized in the plane of the long axis of the molecules (extraordinary rays) on the other hand experience a refractive index gradient and are therefore refracted as is schematically indicated in FIG. 1c.

Consequently, a maximum of 50% of the light in an unpolarized light beam 7 is controllable by the beam shaping device 1 in FIGS. 1a-c.

In the following, three exemplary beam shaping devices/arrangements will be described with reference to FIGS. 2-4.

A first exemplary beam shaping arrangement 20 will be described with reference to FIG. 2, which is a cross-section view showing first 21 and second 22 beam shaping devices as described in connection with FIGS. 1a-c arranged in a stacked structure with an optical member, in the form of a retardation plate 23, sandwiched there between.

Again, three rays 24a-c of unpolarized light will be followed through the beam shaping arrangement 20. As described in connection with FIG. 1b, the extraordinary rays will be influenced by the first beam shaping device 21 and the ordinary rays will pass through this beam shaping device 21 without being influenced. As the ordinary ray go through the retardation plate 23, which is here provided in the form of a so-called half wave plate or an LC polymer in a twisted nematic configuration, the polarization direction is rotated 90°.

Hence, when entering the second beam shaping device 22, the previously unaffected components 25a-c are now polarized in the same plane as the long axis of the LC-molecules 27 of the second beam shaping device 22 and will be deflected in the same manner as the other polarization components 26a, c were when passing through the first beam shaping device 21.

Figure 2:
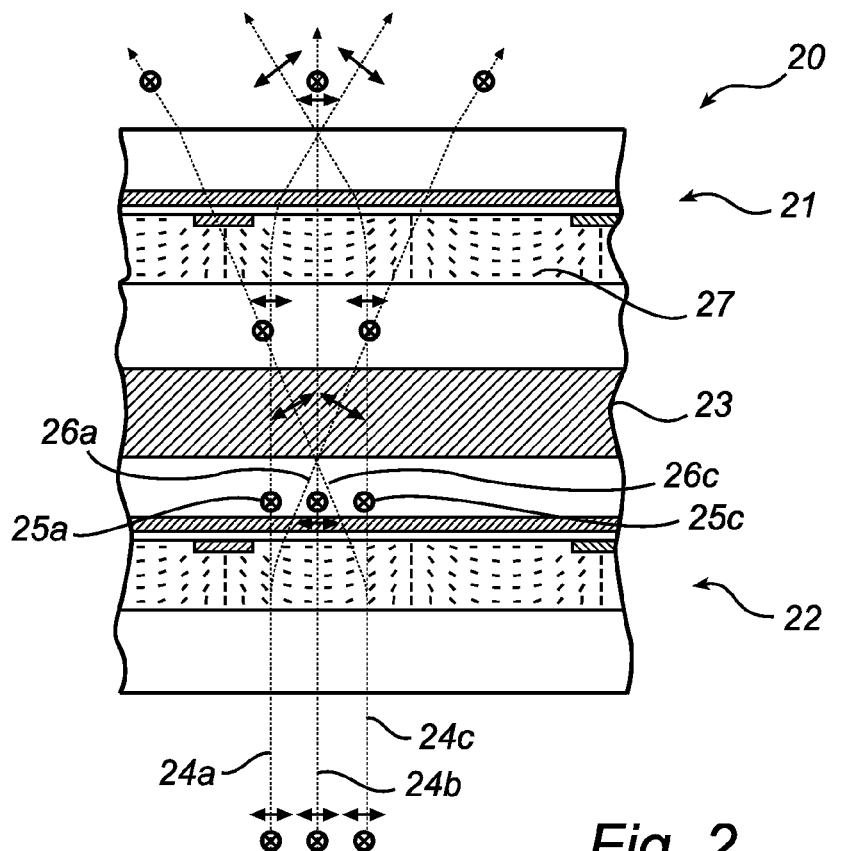
FIG. 2 is a cross-section view of a first beam shaping arrangement wherein a retardation plate is sandwiched between two beam shaping devices.

Hereby, as schematically illustrated in FIG. 2, all of the unpolarized light passing through the beam shaping arrangement 20 can be controlled by the beam shaping arrangement 20.

In the above examples, the behavior of LC molecules with a positive dielectric anisotropy is described. It should, however, be noted that it is also possible to use LC molecules with negative dielectric anisotropy. In that case the rays 24a-c will be refracted in an opposite direction compared to what is described above.

It should be noted that, in the presently illustrated examples, the refraction at interfaces between substrates and LC-layers etc has been disregarded in order to simplify the illustrations.

Figure 3:
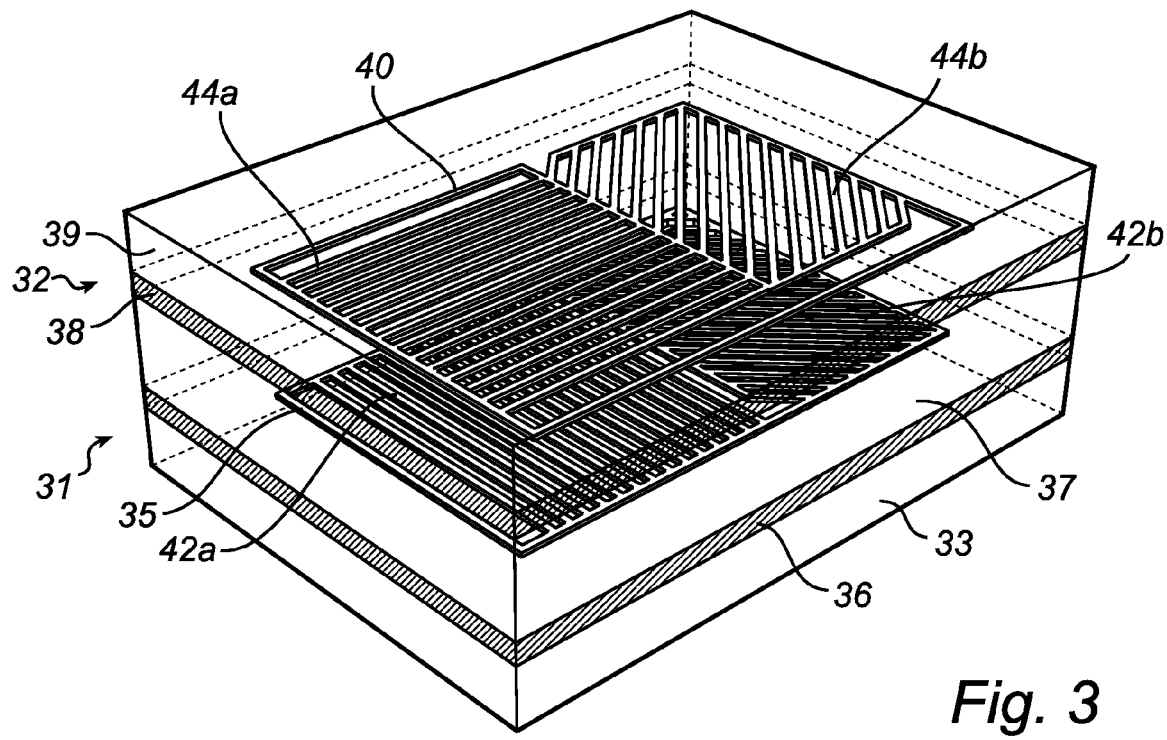
FIG. 3 is a perspective view of a second beam shaping arrangement comprising two beam shaping devices having complementary electrodes, arranged in a stacked structure.

With reference to FIG. 3, a second exemplary beam shaping arrangement 30 will now be described.

In FIG. 3, first 31 and second 32 beam shaping devices are shown in a stacked structure. In order from bottom to top of the stacked structure, the first beam shaping device 31 has a first substrate 33, on which a first electrode layer (not shown), an insulating layer (not shown), a second electrode layer 35, an LC-layer 36, and a second substrate 37 are provided. In the presently illustrated embodiment, the second substrate 37 of the first beam shaping device 31 is also the first substrate of the second beam shaping device 32. Obviously, this common substrate 38 could alternatively be provided as two separate substrates. The second beam shaping device 32 is further provided with first (not shown) and second 40 electrodes, with an insulation layer (not shown) there between, an LC layer 38, and a second substrate 39.

As can be seen in FIG. 3, each of the second electrode layers 35 and 40 of the beam shaping arrangement 30 has two sets 42a-b and 44a-b, respectively, of conductor lines. The first electrode layers could be non-patterned electrode layers, but may alternatively be provided as patterned electrode layers.

Within each set 42a-b and 44a-b, the conductor lines are essentially in parallel to each other, and the two sets 42a-b and 44a-b are provided with an angle of about 45° with respect to each other.

Furthermore, the beam shaping devices 31, 32 are arranged in relation to each other in such way that the electrode 35 of the first beam shaping device 31 are perpendicular to the electrode 40 of the second beam shaping device 32.

Through this beam shaping arrangement 30, an incident collimated beam can be shaped symmetrically and utilizing both polarization components of the incident light.

Figure 4:
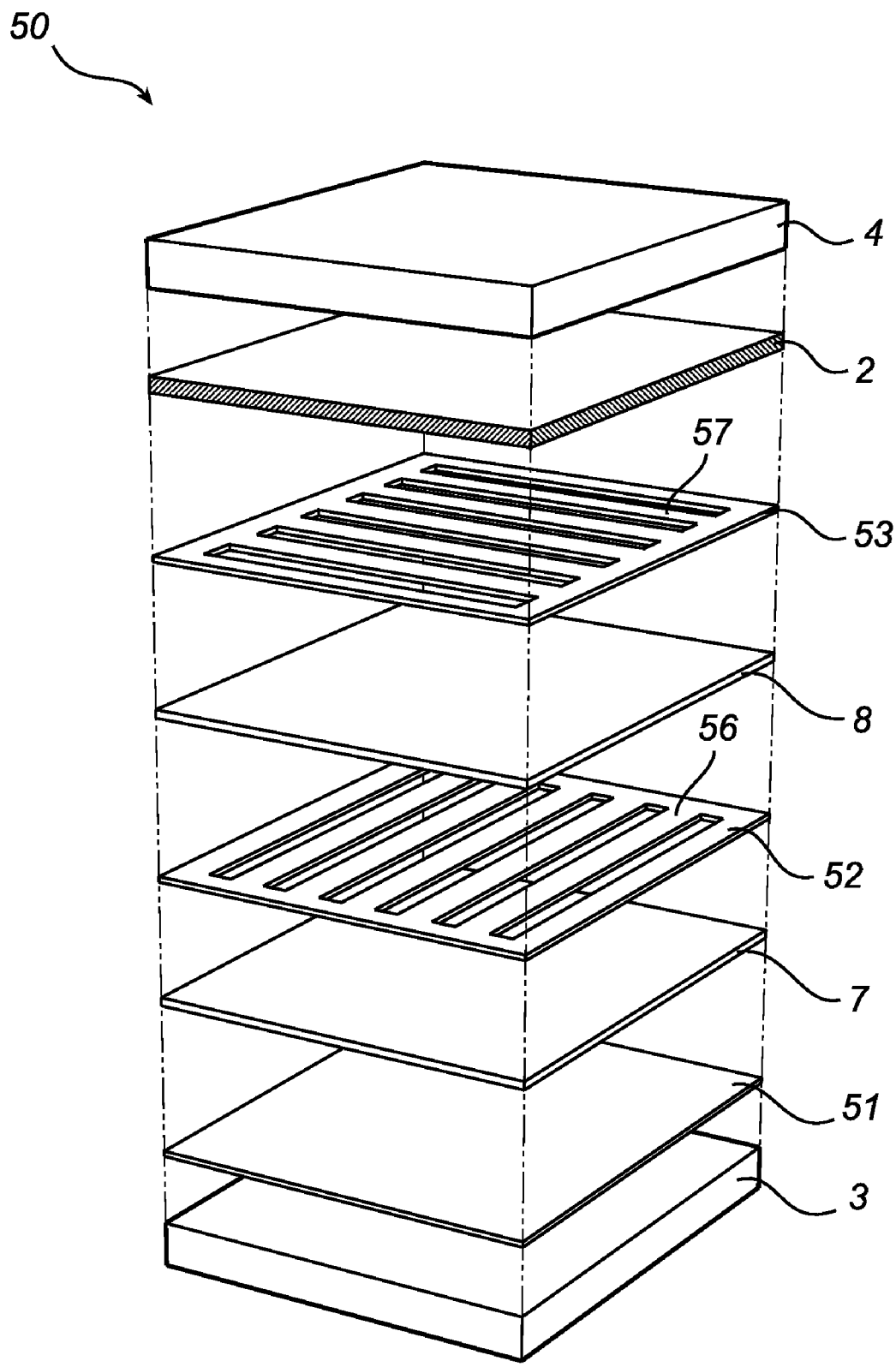
FIG. 4 is an exploded perspective view schematically illustrating another exemplary beam shaping device according to an embodiment of the present invention.

With reference to FIG. 4, a third exemplary beam shaping device/arrangement 50 will be described, which comprises, between first 3 and second 4 optically transparent substrates, in order from bottom to top of the stacked structure, a first electrode layer 51, an insulating layer 7, a second electrode layer 52, a second insulating layer 8, a third electrode layer 53, and an LC-layer 2.

As illustrated in FIG. 4, the first electrode layer 51 is not structured, while each of the second 52 and third 53 electrode layers includes essentially parallel conductor lines. The conductor lines 57 comprised in the third electrode layer 53 are perpendicular to the conductor lines 56 comprised in the second electrode layer 52. Through this configuration, the beam shape characteristics can be varied by applying the voltage between the different electrode layers in various ways. For example, the voltage can be applied between the electrode layer 53 and the electrode layer 52, instead of between the electrode layer 51 and the electrode layer 53 to change the beam shape characteristics of the electro optical element.

Figure 5:
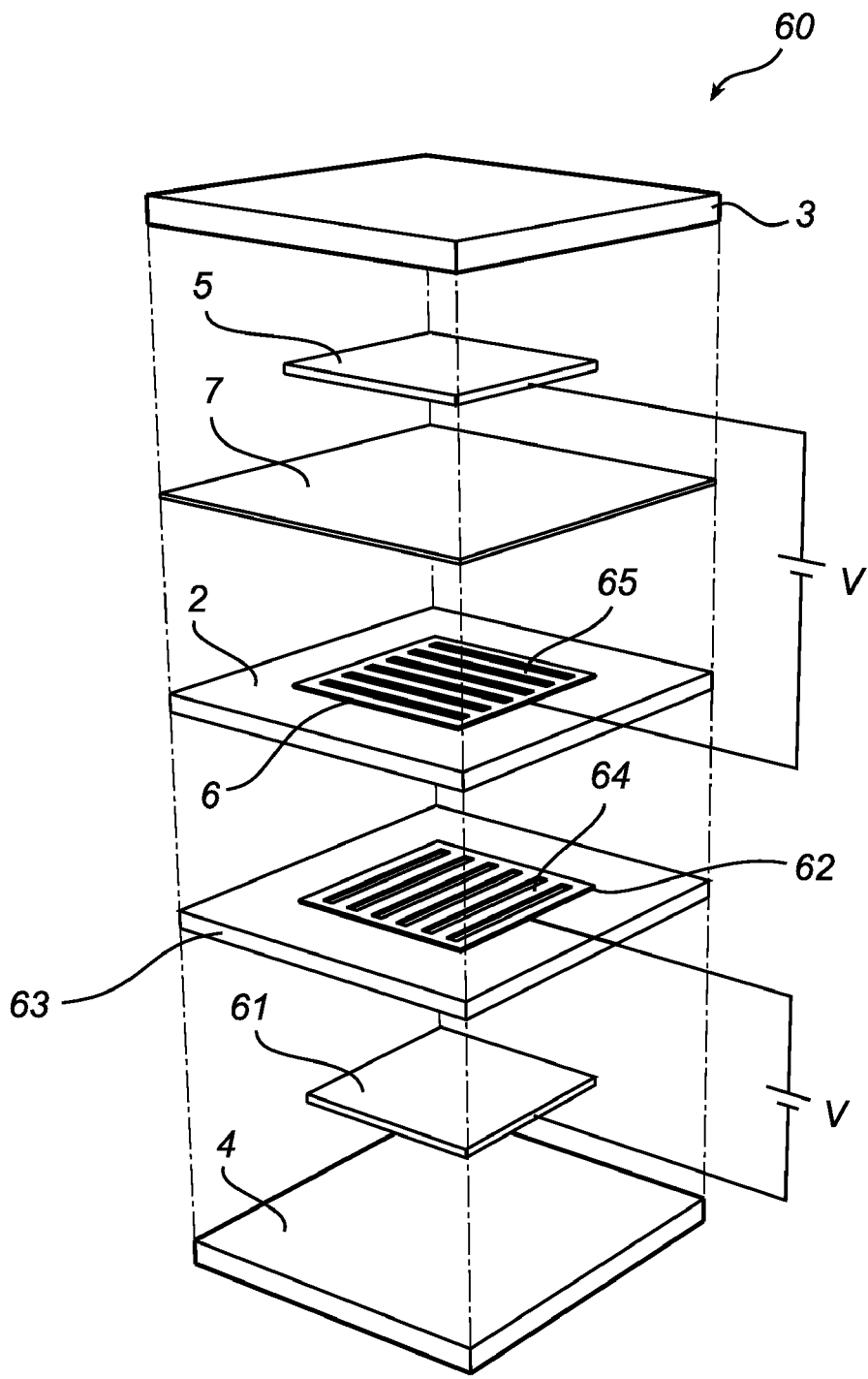
FIG. 5 is an exploded perspective view schematically illustrating another exemplary beam shaping device according to an embodiment of the present invention.

With reference to FIG. 5, another exemplary beam shaping device 60 will now be described, which differs from the embodiment shown in FIG. 1a in that the second substrate 4, like the first substrate 3, is provided with first 61 and second 62 electrode layers, which are separated by an insulating layer 63. As is illustrated in FIG. 5, the second electrode layer 62 provided on the second substrate 4 comprises conductor lines 64 which are essentially perpendicular to the conductor lines 65 included in the second electrode layer 6 provided on the first substrate 3.

In this configuration both polarization components of incident unpolarized light are influenced in a single cell. For the beam shaping device configuration shown in FIG. 5, an initial homeotropic alignment of the liquid crystal molecules is preferred. Upon application of a voltage between the first and second electrode layers on either side of the liquid crystal layer, the liquid crystal molecules are tilted in such a way that the first polarization component is influenced by the liquid crystal molecules on the first substrate side and the second polarization component (orthogonal to the first polarization component) is influenced by the liquid crystal molecules on the second substrate side.

In addition to the electrode configurations illustrated in FIGS. 1a, 3 and 5, many other electrode configurations are possible and may be advantageous depending on the particular application. A few examples of such additional electrode configurations are schematically illustrated in FIG. 6.

Figure 6:
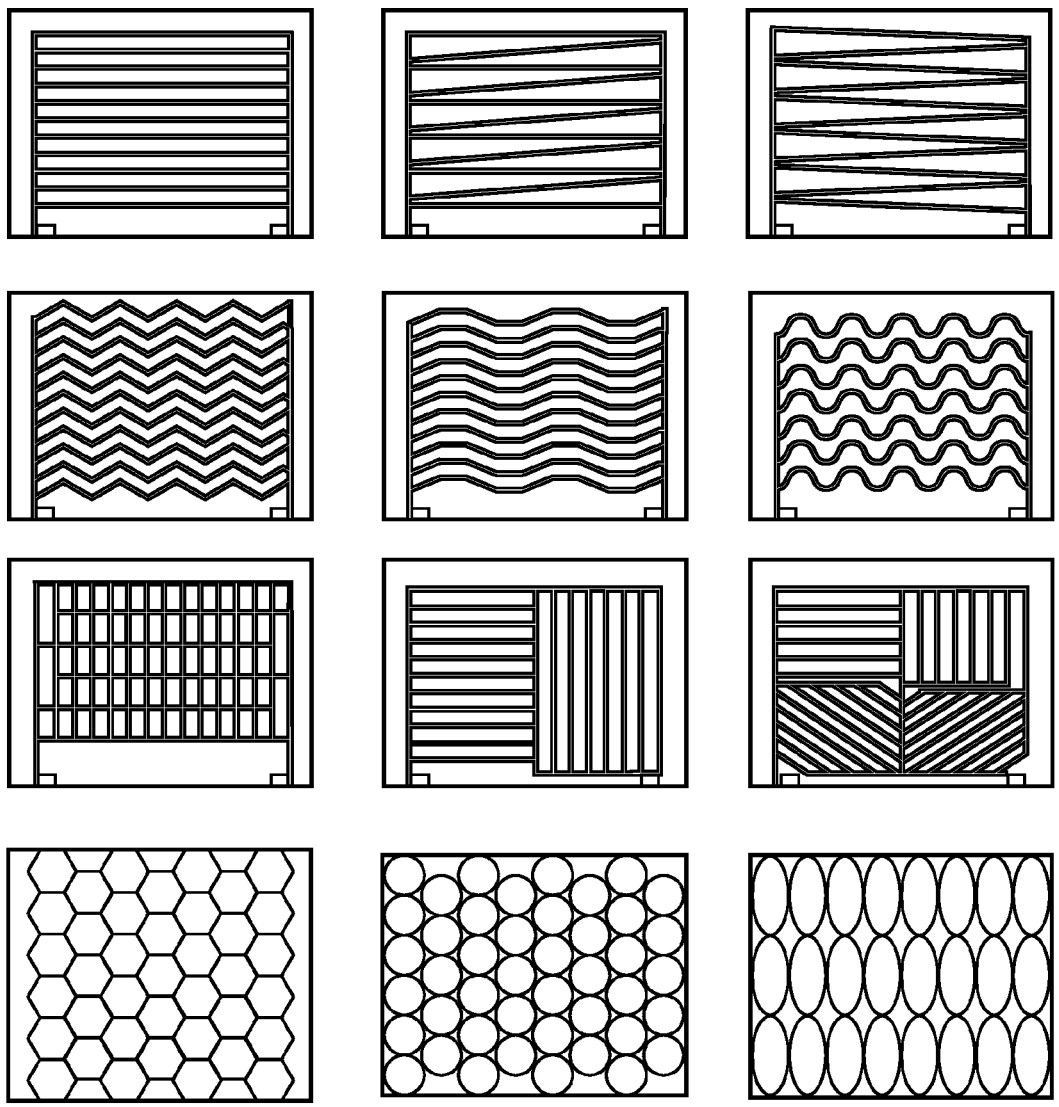
FIG. 6 shows various exemplary electrode configurations.

It should be noted that the variations illustrated in FIG. 6 represent examples only and that many other variations are apparent to one skilled in the relevant art.

The person skilled in the art realizes that the present invention by no means is limited to the preferred embodiments. For example, the electric field applied across the electrodes may advantageously be obtained through the application of an alternating voltage having a frequency above 100 Hz in order to overcome charging effects. It is also possible to use a pixelated cell in combination with active matrix addressing. Moreover, the beam of light to be shaped may be obliquely incident on the beam shaping device.

Simulation Results

Figure 7A:
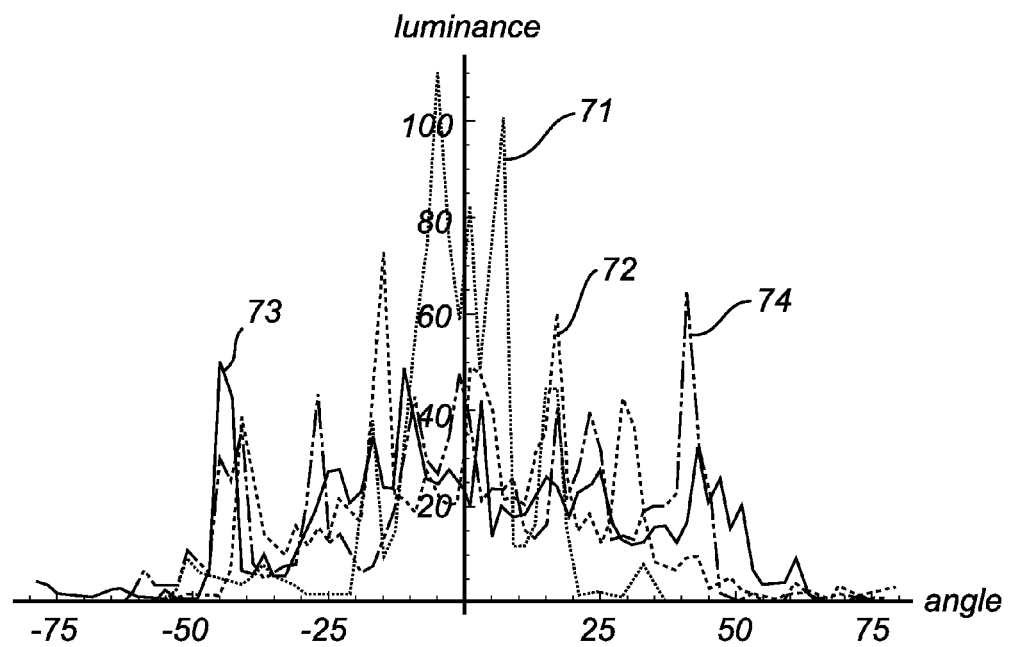
FIG. 7a-b are diagrams illustrating theoretical calculations performed on a beam shaping device according to an embodiment of the present invention.
Figure 7B:
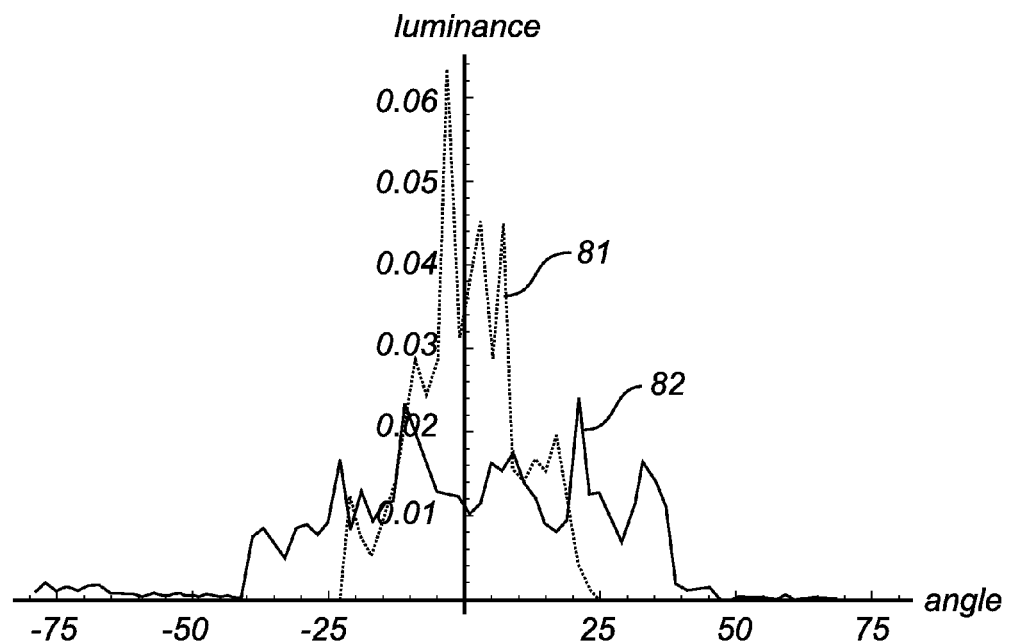

With reference to FIGS. 7a-b, which are diagrams illustrating the angular light distribution generated by the liquid crystal GRIN (gradient index) micro lens system based on embodiments of the present invention, a brief description of some of the simulations carried out will now be provided. In all of the figures, the intensity has been normalized in order to illustrate the angular distribution. Furthermore, in the curves, beams that are only slightly diverged have been clipped to improve the discernability of the more diverged beams.

In FIG. 7a, the angular light distribution generated by the liquid crystal GRIN microlens system based on the electrode structure shown in FIG. 1 is illustrated. The graph indicates the angular light distributions for this system for +/−5 Vrms, as illustrated by the curve 71 in FIG. 7a, +/−10 Vrms, curve 72 in FIG. 7a, +/−15 Vrms, curve 73 in FIG. 7a, and +/−20 Vrms, curve 74 in FIG. 7a. These graphs show that a homogeneous angular distribution can be achieved. The angular range is 2×50 degrees for applied voltages of +/−20 Vrms.

In FIG. 7b, the angular light distribution generated by the liquid crystal GRIN microlens system based on an electrode structure wherein the first and the second electrode layers have the same electrode pattern, comprising essentially parallel conductor lines, is illustrated.

The characteristics of the cell used in the simulation resulting in the graphs in FIG. 7b are as follows:
  Electrode width: 2 μm
  Inter electrode spacing: 3 μm
  Insulating layer thickness: 400 nm The graph indicates the angular light distributions for this system for +/−10 Vrms, as illustrated by the curve 81 in FIG. 7b, and +/−20 Vrms, curve 82 in FIG. 7b. These graphs show that a homogeneous angular distribution can be reached. The angular range is 2×40 degrees for applied voltages of +/−20 Vrms.

The invention claimed is:

1. A beam shaping device, comprising first and second substrates, a liquid crystal layer sandwiched between said substrates, and a first electrode layer provided on a side of said first substrate facing said liquid crystal layer, said beam shaping device being controllable between beam shaping states, each permitting passage of light through said beam shaping device, said beam shaping device further comprising an insulating layer at least partially covering said first electrode layer, and a second electrode layer provided on top of said insulating layer, said second electrode layer comprising a conductor pattern exposing a portion of said insulating layer, wherein application of a voltage (V) between said first and second electrode layers causes liquid crystal molecules in a portion of said liquid crystal layer corresponding to the exposed portion of the insulating layer to tilt in a plane perpendicular to said liquid crystal layer, resulting in a local refractive index gradient, thereby enabling shaping of a beam of light passing through said beam shaping device, and wherein said conductor pattern includes a plurality of mutually spaced apart conductors together constituting a continuous portion of said second electrode layer such that said mutually spaced apart conductors are electrically interconnected.

2. A beam shaping device according to claim 1 wherein said mutually spaced apart conductor are provided as essentially parallel conductor lines.

3. A beam shaping device according to claim 2, wherein said second electrode layer comprises a first portion with essentially parallel conductor lines having a first principal direction of extension, and a second portion with essentially parallel conductor lines having a second principal direction of extension which is different from said first principal direction of extension.

4. A beam shaping device according to claim 1, wherein said liquid crystal layer is homeotropically aligned when not subjected to an electric field.

5. A beam shaping device according to claim 1, wherein said liquid crystal layer has a planar uniaxial alignment such that liquid crystal molecules comprised in said liquid crystal layer are perpendicular to an adjacent conductor line when not subjected to an electric field.

6. A beam shaping device according to claim 1, wherein said first electrode layer comprises a conductor pattern that includes a plurality of mutually spaced apart conductors.

7. A beam shaping device according to claim 1, further comprising a third electrode layer provided between said first and second electrode layers, said third electrode layer including a conductor pattern having a plurality of mutually spaced apart conductors.

8. A beam shaping device according to claim 1, wherein said second substrate, on a side thereof facing said liquid crystal layer, is provided with first and second electrode layers and an insulating layer sandwiched between said electrode layers, the second electrode layer being arranged closer to said liquid crystal layer than the first electrode layer.

9. A beam shaping device according to claim 8, wherein said second electrode layer provided on the first substrate comprises a plurality of mutually spaced apart and essentially parallel conductor lines, and said second electrode layer provided on the second substrate comprises a plurality of mutually space apart and essentially parallel conductor lines being essentially perpendicular to the conductor lines of the second electrode layer provided on the first substrate.

10. A beam shaping arrangement comprising first and second beam shaping devices according to claim 1, arranged in a stacked structure.

11. A beam shaping arrangement according to claim 10, wherein each of said first and second beam shaping devices comprises a plurality of essentially parallel conductor lines in its respective second electrode layer, and wherein said first and second beam shaping devices are arranged in relation to each other in such a way that the essentially parallel conductor lines of the first beam shaping device are substantially perpendicular to the essentially parallel conductor lines of the second beam shaping device.

12. A beam shaping arrangement according to claim 10, further comprising an optical member arranged between said first and second beam shaping device, and being adapted to alter a polarization state of a light beam passing through said beam shaping arrangement.

13. A light output device comprising a beam shaping device according to claim 1, and a light source, arranged so that a light beam emitted by said light source passes through said beam shaping device.

* * * * *